United States Patent [19]

Yopp

[11] Patent Number: 4,882,693
[45] Date of Patent: Nov. 21, 1989

[54] AUTOMOTIVE SYSTEM FOR DYNAMICALLY DETERMINING ROAD ADHESION

[75] Inventor: W. Trent Yopp, Canton, Mich.

[73] Assignee: Ford Motor Company, Dearborn, Mich.

[21] Appl. No.: 137,908

[22] Filed: Dec. 28, 1987

[51] Int. Cl.⁴ .............................................. G06F 15/00
[52] U.S. Cl. ..................................... 364/424.01; 73/9; 280/707; 364/426.01
[58] Field of Search ............. 280/707; 188/299; 73/9; 377/26; 180/79, 143; 364/424.01, 426.02; 356/152

[56] References Cited

U.S. PATENT DOCUMENTS

| | | | |
|---|---|---|---|
| 3,893,330 | 7/1975 | Shute et al. | 73/9 |
| 4,050,290 | 9/1977 | Lonnroth | 73/9 |
| 4,130,362 | 12/1978 | Lill et al. | 356/152 |
| 4,212,063 | 7/1980 | Härdmark | 73/9 |
| 4,349,079 | 9/1982 | Leiber | 180/143 |
| 4,485,452 | 11/1984 | Cording et al. | 377/26 |
| 4,545,240 | 10/1985 | Leiber | 73/146 |
| 4,621,833 | 11/1986 | Soltis | 280/707 |
| 4,687,223 | 8/1987 | Miyoshi et al. | 180/142 |
| 4,693,522 | 9/1987 | Wupper et al. | 364/426.02 |
| 4,747,055 | 5/1988 | Eto et al. | 364/424.01 |
| 4,755,945 | 7/1988 | Eade et al. | 364/426.02 |
| 4,779,447 | 10/1988 | Rath | 73/9 |
| 4,784,234 | 11/1988 | Naito et al. | 180/79 |

FOREIGN PATENT DOCUMENTS 1153273 4/1985 U.S.S.R. ..................... 73/8

Primary Examiner—Parshotam S. Lall
Assistant Examiner—V. Trans
Attorney, Agent, or Firm—Jermoe R. Drouillard; Roger L. May

[57] ABSTRACT

A system for determinng the road adhesion of a tire installed on a road wheel of an automotive vehicle operating on a roadway includes a road wheel turn angle measuring device, a vehicle speed measuring mechanism and a steering force measuring mechanism. Information regarding turn angle, vehicle speed and steering force are fed into a processor which determines the road adhesion of the tire.

17 Claims, 5 Drawing Sheets

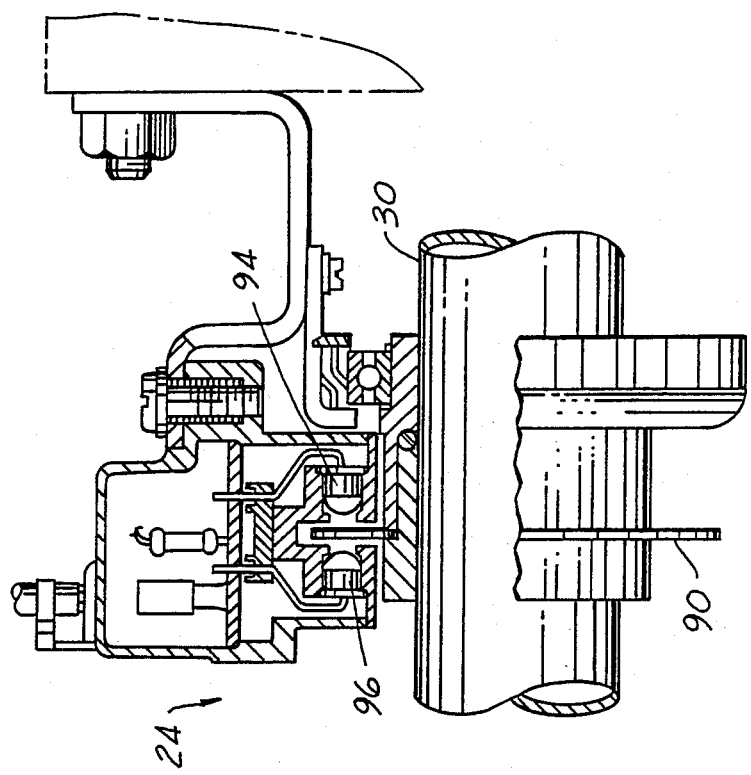
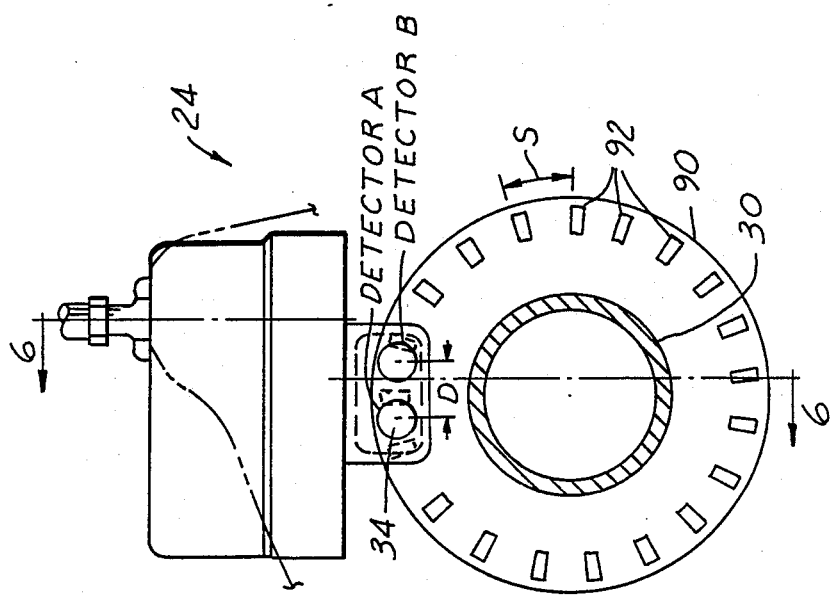

AUTOMOTIVE SYSTEM FOR DYNAMICALLY DETERMINING ROAD ADHESION

BACKGROUND OF THE INVENTION

This invention relates to a vehicular system for dynamically determining the road adhesion existing between a tire and a roadway—i.e., when a vehicle equipped with the system is operating along a road.

DISCLOSURE INFORMATION

U.S. patent application No. 066,690, filed June 26, 1987, which is assigned to the assignee of the present invention, discloses a system which may be used for detecting the vehicle operating condition when one of the vehicle's road wheels is running on a slick surface such as ice, whereas one or more of the remaining vehicle wheels is operating on a surface having a higher friction coefficient. Such a system provides only a relative measure of the road adhesion developed by the tires and cannot provide a quantitative measurement of road adhesion. For the purposes of this document, the term "road adhesion" refers to the friction developed between a vehicle tire and a road surface the tire is being operated on. Typically, road adhesion is measured in terms of tractive effort.

Certain antilock brake control systems employ a plurality of wheel speed sensors which detect wheel lockup. Such lockup may occur because of a low-friction roadway surface (e.g., smooth ice). Such systems, do not, however, directly measure road adhesion. Rather, such systems measure the effect of the lack of road adhesion or rather, inadequate road adhesion.

It is an object of the present invention to provide a system for dynamically determining road adhesion.

It is an advantage of the present system that the ability to determine road adhesion is not effected by tire wear or by the type of tire employed.

It is a further advantage of the present invention that a road adhesion measuring system according to this invention could be used in conjunction with a driver warning system, a brake control system, a suspension control system, a vehicle speed control system, a steering gear power assist control system, or yet other types of vehicular systems.

It is a still further advantage of the present system that this system could be utilized to warn a vehicle driver of unsafe road conditions.

Other objects, features, and advantages of the present invention will become apparent to those skilled in the art to which this invention pertains.

SUMMARY OF THE INVENTION

A system for determining the road adhesion of a tire installed on a road wheel of an automotive vehicle operating on the roadway includes road wheel turn angle measuring means comprising means for producing a first signal representing the turn angle at which the steering system of the vehicle is being operated and vehicle speed measuring means comprising means for producing a second signal representing the speed at which the vehicle is being operated. A system according to this invention further includes steering force measuring means comprising means for producing a third signal representing the steering force required to operate the steering system of the vehicle at a measured road wheel turn angle and vehicle speed and processor means for determining the road adhesion of the tire, with the processor means comprising means for receiving the first, second and third signals as previously described, and means for deriving from the signals a fourth signal representing the magnitude of road adhesion. The processor means may determine road adhesion by matching measured road wheel turn angle, vehicle speed and steering force with one of a plurality of reference triads comprising road wheel turn angle, vehicle speed, and steering force values where each of such reference triads corresponds to a predetermined value of road adhesion. Each triad would have a corresponding value for a fourth signal related to road adhesion, which signal would be read following the triad matching process. Accordingly, the processor could comprise a read-only memory containing the reference triads and fourth signal values. Alternatively, the processor means could determine road adhesion by operating upon the first, second and third signals with a mathematical function contained in the processor, to thereby derive such fourth signal.

The road wheel turn angle measuring means comprising a portion of a system according to the present invention could comprise an electro-optical angle measuring means operatively connected with a steering system for controlling the road wheel and responsive to the movement of a steering hand wheel. The vehicle speed measuring means included with the system according to this invention could comprise a signal generator driven by the powertrain of the vehicle. The steering force measuring means could comprise a pressure transducer interposed between a steering gear for steering said road wheel and a hydraulic pump for powering the steering gear. Alternatively, the steering force measuring means could comprise a torque sensor for sensing the torque applied to the driveshaft of the steering gear.

In another embodiment of the invention, an emergency operating system for determining the road adhesion of a tire installed on a road wheel of an automotive vehicle operating on a roadway could comprise not only the road wheel turn angle, vehicle speed and steering force measuring means and processor means previously described, but also an emergency control means responsive to a signal generated by the processor in the event the measured road adhesion is less than a threshold value, with the emergency control means comprising means for operating an emergency control system. Such an emergency control system could include means for regulating the operation of a brake system incorporated in the vehicle, or means for warning the driver of the vehicle that road adhesion is less than a threshold value, or means for limiting the maximum speed or forward acceleration of the vehicle. An emergency control system according to the present invention could also include means for operating an adjustable suspension system including variable damping or spring rate characteristics. Finally, an emergency control system according to this invention could include means for controlling the output of a power assist device associated with the steering system of the vehicle. Such means for controlling the output of a power source associated with the steering system could comprise the valve for modulating the magnitude of the assist produced by the power assist device.

BRIEF DESCRIPTION OF THE DRAWINGS

FIGS. 5 and 6 illustrate a turn angle sensor suitable for use with an embodiment of the present invention.

DESCRIPTION OF THE PREFERRED EMBODIMENTS

Vehicle pperation may be enhanced if road adhesion may be dynamically determined for any particular road condition. The present invention teaches that it is possible to do this if the vehicle's speed, turn angle and steering effort are known, because for a given speed and turn angle, the magnitude of the steering effort is proportional to the amount of friction or adhesion developed between the tire and the road surface. By feeding back these three parameters into, for example, lookup tables contained within the read-only memory (ROM) of a microprocessor, the road surface/tire friction condition may be determined.

Figure 7:
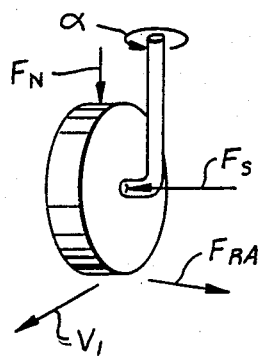
FIG. 7 is a free body diagram illustrating several of the forces acting upon a road wheel and tire assembly during a turning maneuver.

FIG. 7 illustrates the various parameters with which a system according to this invention operates. Turn angle, $\alpha$, is a measure of the steering angle at which the steering road wheels are positioned. Velocity, V, is a measure of the forward velocity of the vehicle. Normal force, $F_N$, is the force usually associated with the vehicle's weight, which acts downwardly through the road wheel and tire. Steering force, $F_S$, is a measure of the force required to maintain the steering road wheels at any particular value of $\alpha$. Finally, road adhesion, $F_{RA}$, is a measure of the tractive or frictional force developed by the tire with respect to the roadway.

Information from a system according to the present invention may be used to control a variety of vehicle functions. For example, the driver may be warned that road adhesion is less than a threshold value. In other words, the driver may be warned that the traction between the road surface and the tire is less than a desired amount. A system according to the present invention may also be used for directly intervening into the operation of the vehicle by limiting the maximum speed or forward acceleration of the vehiole. In the event that a vehicle having the present system is equipped with an adjustable suspension system including, for example, variable damping capability, or variable spring rate capability, or both, it may be desirable, in the event that road adhesion is low, to limit the adjustability of the suspension system. This could involve, for example, operation of a suspension system in only a normal damping level as opposed to a firm or soft damping level. In the event that a vehicle equipped with this system has an antilock brake system, a road adhesion warning from the present system could be employed for triggering operation of such antilock system. Finally, a road adhesion measuring system according to the present invention could be used to control the amount of boost provided by a power steering system. This feature could be used to give the vehicle's driver increased feedback of road conditions during episodes of adverse weather. In a related vein, a system according to the present invention could be employed with known traction enhancement systems which selectively brake a slipping drive wheel sensed by one of wheel speed sensors 14 (FIG. 1) to allow transfer of engine torque to a non-slipping drive wheel.

Figure 1:
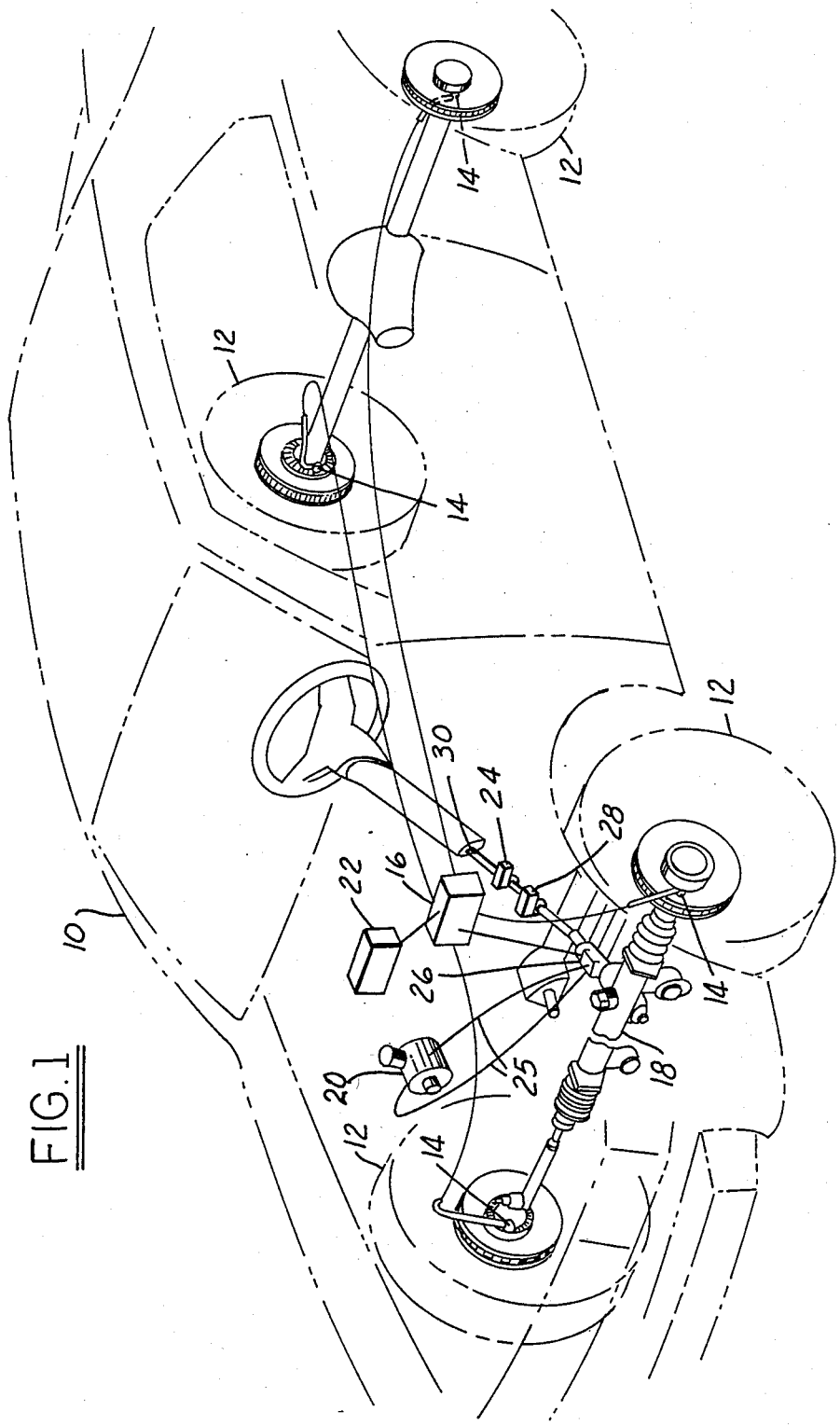
FIG. 1 is a perspective drawing of a motor vehicle incorporating the present invention. This figure shows some of the various components of a system embodying the present invention.
Figure 2:
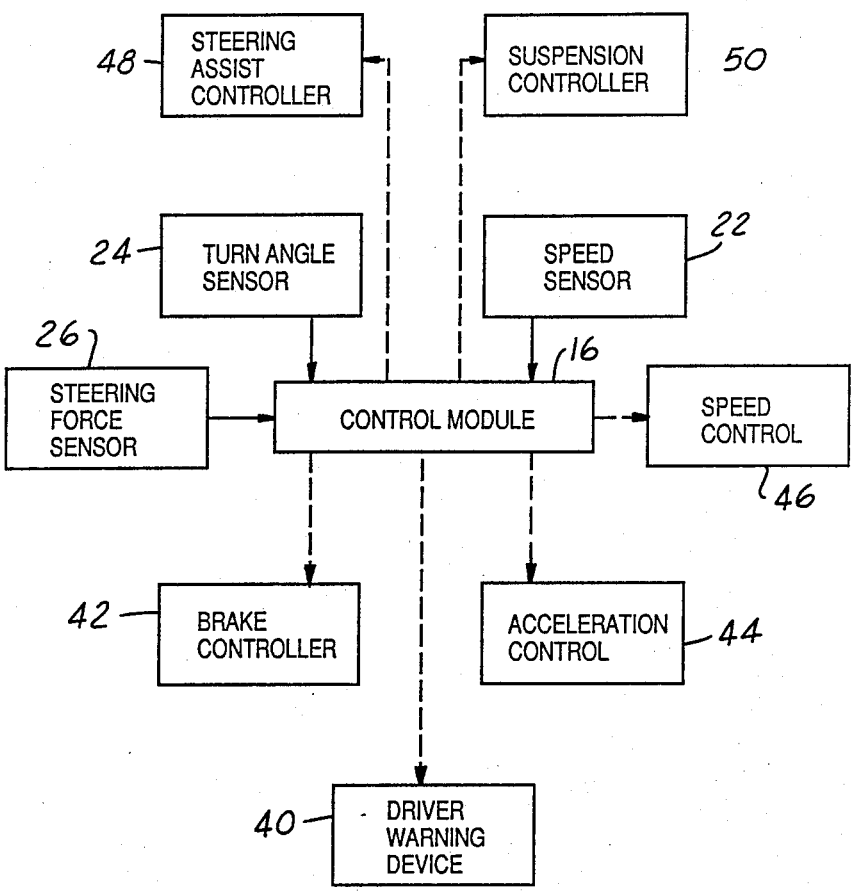
FIG. 2 is an overall system block diagram in accordance with an embodiment of this invention.

As shown in FIG. 1, a vehicle equipped with a system for dynamically determining road adhesion according to the present invention includes a plurality of road wheels, 12, in this case four in number. A control module, 16, receives signals from various sensors within the vehicle and operates various devices. The three principal sensors from which control module 16 receives information are speed sensor 22, turn angle sensor 24, and steering force sensor 26 (see also. FIG. 2). Although many types of automotive speed sensors are known, one type suitable for use with a system according to the present invention comprises a signal generator driven by the powertrain of the vehicle. One such type of signal generator presently used in Ford Motor Company vehicles comprises a variable reluctance alternating current generator.

An example of a turn angle sensor suitable for use according to the present invention is shown in FIGS. 5 and 6. Usage of the illustrated turn angle sensor according to two different algorithms is explained in U.S. Pat. No. 4,621,833, and allowed U.S. patent application Ser. No. 046,005, filed May 4, 1987, both of which are assigned to the assignee of the present invention, and which are hereby incorporated by reference. In general, the sensor illustrated in FIGS. 5 and 6 cooperates with control module 16 to produce a first signal representing the turn angle, $\alpha$, at which the steering system of the vehicle (and, hence, the steerable road wheels) is being operated. Turn angle sensor 24 includes means for measuring $\alpha$ from a center position determined by the turn angle sensor in conjunction with control module 16. As shown in FIGS. 5 and 6, turn angle sensor 24 comprises shutter wheel 90, attached to steering shaft 30, which shaft rotates in unison with the steering wheel as the steering wheel is turned by the driver of the vehicle. Shutter wheel 90 has a plurality of apertures 92, in this case 20 in number, which apertures serve to trigger the activity of detectors A and B as the shutter wheel is rotated with the steering system of the vehicle. Because there are 20 apertures contained within shutter wheel 90, the turn angle sensor provides a signal 80 times during one revolution of the steering wheel and as a result each of the 80 signals or steps indicates 4.5° of rotation of the steering system.

As shown in FIGS. 5 and 6, each of detectors A and B includes a light emitting diode (LED), 94, and a photodiode, 96. The combination of the LED and the photodiode is used to detect movement of shutter wheel 90, and hence, the steering system. This is possible because the photodiodes have two states—i.e., they are bistable. A conducting state occurs whenever light from the paired LED passes through an aperture 92 in the shutter wheel and impinges upon the photodiode. The output of the detector circuit then rises to approximately 5 volts. A non-conducting state exists whenever the shutter wheel blocks the transmission of light between the LED and the photodiode. Detectors A and B are spaced apart such that clockwise rotation of shutter wheel 90 produces a waveform pattern for the detectors in which detector A undergoes its transition prior to detector B. In other words, detector A leads detector B.

On the other hand, counterclockwise rotation of the steering sensor produces a waveform pattern for the detectors in which detector A undergoes its transition after detector B and detector A thus lags detector B. The outputs of detectors A and B are fed into control module 16 and in this manner the control module is allowed to track the steering system's rotation by counting the number of 4.5° steps the system has rotated from a predetermined center position. Those skilled in the art will appreciate in view of this disclosure that the illustrated turn angle sensor is exemplary of a class of devices which may be used for the purpose of determining the turn angle and for providing a signal representative of the turn angle to the control module. For example, it would be possible to employ a rotary slide wire potentiometer, or other known devices, for this purpose.

Steering gear pressure sensor 26, in conjunction with control module 16, comprises means for producing a third signal representing the steering force, $F_S$, required to operate the steering system of the vehicle at any particular road wheel turn angle, $\alpha$, and vehicle speed, V. As shown in FIG. 1, steering gear pressure sensor 26 is mounted upon the steering gear, or at least in close proximity thereto. The purpose of steering gear pressure sensor 26 is to measure the hydraulic pressure maintained by steering pump 20 and hydraulic pressure hoses 25. This pressure is directly relatable to the amount of steering force, $F_S$, required to keep the road wheels at any particular turn angle, $\alpha$. The steering pressure sensor is operatively connected with control module 16 so that steering pressure information is provided on demand by the pressure sensor to the control module. The configuration of the pressure sensor could comprise any one of several known configurations operating according to a number of principles such as a piezoelectric sensor in which a crystal generates an electrical charge proportional to the pressure exerted upon the crystal, which is typically quartz. Those skilled in the art will appreciate in view of this disclosure that other types of pressure sensors such as those utilizing strain-gauge or electromagnetic principles, or variable capacitance diaphragm devices could be used. A discussion of such sensors is found in *Internal Combustion Enoines*. International Textbook Company, 1968, at pgs. 147-153, which is hereby incorporated by reference.

Those skilled in the art will similarly appreciate in view of this disclosure that alternative means are available for measuring steering force in addition to the previously outlined pressure system. Accordingly, $F_S$, or steering force could be measured by means of a torque sensor for sensing the torque applied to the driveshaft of the steering gear. Such a torque sensor could comprise any one of a number of known devices using strain gauges, load cells, piezoelectric crystals or other devices. Finally, steering force could be measured using current and voltage data for the driving potential powering an electrically driven steering gear.

Figure 3:
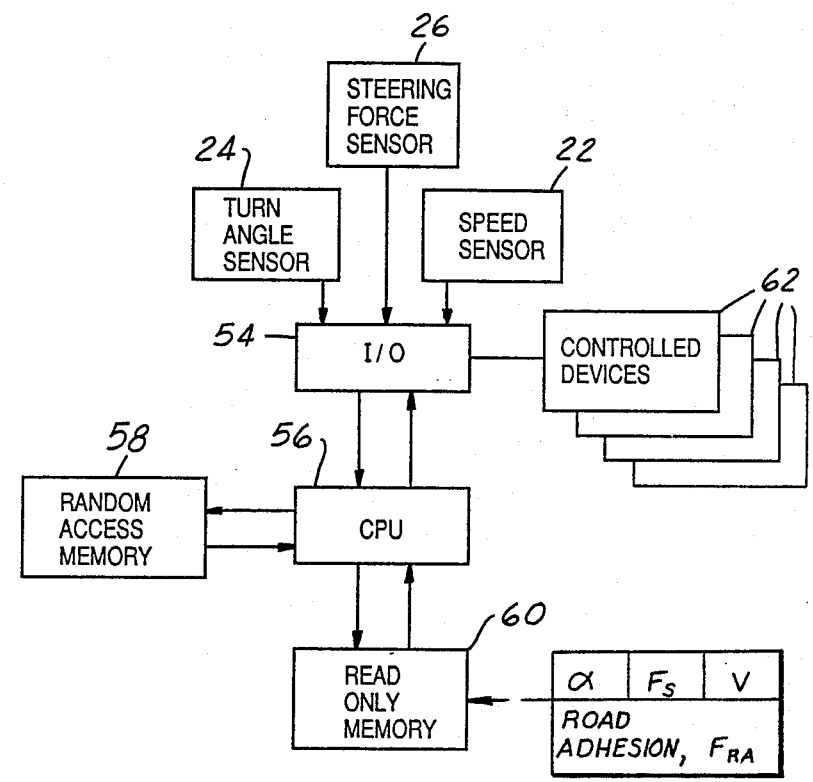
FIG. 3 is a block diagram showing a portion of 15 a microprocessor which may be included in a system according to the Present invention, and interconnected sensors and controlled devices.

A processor means within control module 16 operates upon the data provided by the turn angle sensor 24, steering force sensor 26 and speed sensor 22 as follows. As shown in FIG. 3, data from the speed, steering force and turn angle sensors are fed into a central processor unit, 56, by means of input output circuits, 54. Those skilled in the art will appreciate in view of this disclosure that the central processor and its associated peripheral equipment could be structured according to several known architectures. In a preferred embodiment, however, the processor is configured so that a control program is sequentially read for each unit command from a read-only memory (ROM), 60, which stores preset control programs. Unit commands are executed by the central processor. As previously noted, the Input/Output "I/O" device serves to connect the balance of the microprocessor of the other components of the system such as the sensors and control devices. The I/0 device could contain signal conditioning circuits and devices such as filters for rejecting spurious signals. A random access memory (RAM), 58, stores data for use by the CPU. A number of different microprocessors could be used to practice the present invention such as the Model 8096 made by the Intel Corporation, or other microprocessors known in the art.

Figure 4:
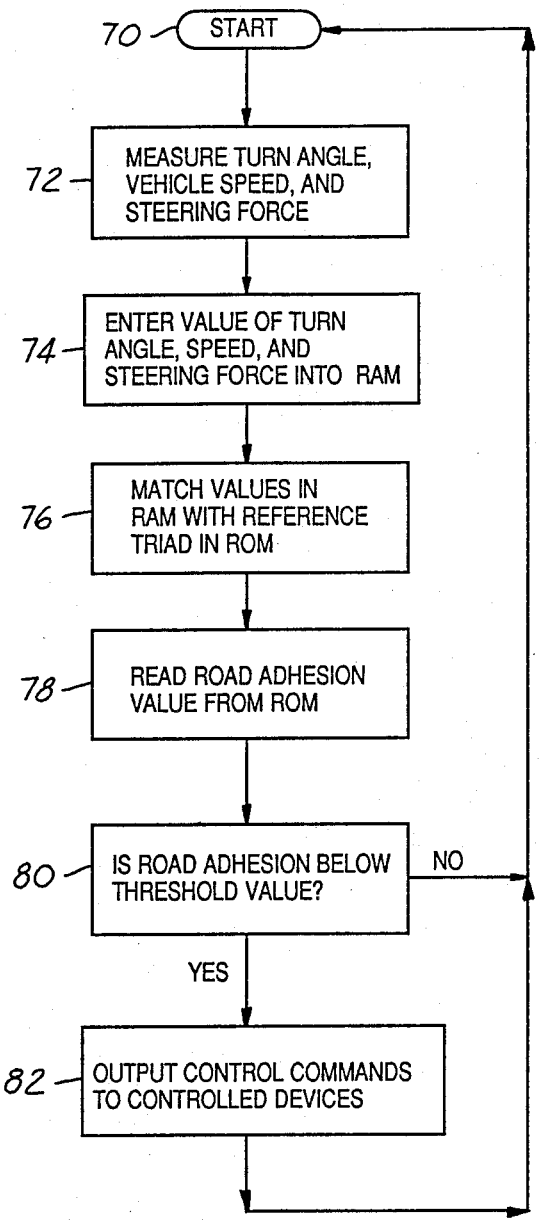
FIG. 4 is a logic flow block diagram in accordance with an embodiment of this invention.

The CPU uses data from the speed, turn angle and steering force sensors according to the algorithm shown in FIG. 4 to find an actual road adhesion value. Beginning at block 72, control module 16 gives the order to measure turn angle, $\alpha$, vehicle speed, V, and steering force, $F_S$. At block 74, these values are entered into the RAM. At block 76, the processor matches the measured values for $\alpha$, V, and $F_S$ with one of a plurality of reference triads within the ROM comprising predetermined values of $\alpha$, V, and $F_S$. Each of the reference triads corresponds to a predetermined value of road adhesion, $F_{RA}$. Having found an appropriate reference triad in which each of the values of $\alpha$, V, and $F_S$ is matched, the computer then reads a road adhesion value from the ROM at block 78 (see also. FIG. 3). This road adhesion value will correspond to the reference values in the triad. Having read the road adhesion value at block 78, the computer moves to block 80 wherein a question is asked—Is road adhesion below a threshold value? If the answer is "no", the computer continues to start block 70 and repeats the process. If, however, the answer to the question in block 80 is "yes", the computer will know that road adhesion lies below a pre-determined value and that action should correspondingly be taken. Accordingly, at block 82 an output control command will be given to one or more controlled devices. The controlled devices labeled 62 in FIG. 3 will, thereafter be given commands by input/output device 54. After giving a control command at block 82, the processor will continue running the program represented by FIG. 4. If the answer to the question of block 80 subsequently becomes "no", the processor will cancel any control commands which had previously been issued.

In addition to the previously described lookup table scheme for determining road adhesion through the use of reference triads, those skilled in the art will appreciate in view of this disclosure that the processor means may comprise means for operating upon the first, second and third signals produced by the transducers with a mathematical function contained in the processor to thereby derive the force signal. It may be preferred, however, to use a lookup table method for implementing a system such as that described herein because the lookup table medium allows "tuning" of the system to the individual characteristics of a particular vehicle, without the necessity of reworking equations contained within the CPU. Moreover, if a system according to the present invention is used with a variable assist power steering gear, it will likely be necessary to provide separate lookup table values for steering force levels corresponding to the various levels of power assist.

Those skilled in the art will appreciate in view of this disclosure that a system according to the present invention could be employed with one or more of the steerable wheels of a vehicle. In the event that the system is applied to two steerable wheels located on opposite sides of the vehicle, the weight transfer which usually occurs during cornering maneuvers could affect the road adhesion calculated for each of the opposing wheels by causing an increase in measured adhesion for the wheel on the outside of the turn and a decrease in measured adhesion for the wheel at the inside of the turn. This phenomenon could be compensated for by averaging the two calculated road adhesion values. This averaging technique is useful as well for accommodating steering systems which steer individual wheels by differing amounts.

Those skilled in the art will further appreciate in view of this disclosure that a variety of threshold road adhesion values could be employed, with each of the threshold values corresponding to a different reference road adhesion level. A plurality of road adhesion values could be used as follows. First, in the event that a very low road adhesion value is sensed, the control module may give a signal restraining the vehicle's power plant during accelerations. Accordingly, as shown in FIG. 2, control module 16 is connected to acceleration control 44. If an extremely low level of road adhesion is detected, i.e., smooth ice, driver warning device 40 may be activated. The driver warning device could comprise an alarm bell or warning lamp or other suitable device.

An example will serve to further demonstrate operation of a system according to the present invention. First, assume that a vehicle with the present system is being operated upon smooth ice. When the vehicle is operated around a corner, the turn angle measuring means will measure the turn angle of the vehicle. Similarly, the vehicle speed and steering force measuring means will measure these variables. Note, however, that the steering force, $F_S$, required to position the road wheels at a given turn angle and vehicle speed will usually be much less for smooth ice than for a dry asphaltic roadway. This is true because of the road adhesion between the tire and an icy roadway will be very much lower than the situation when the vehicle is operated on a dry, hard surfaced road. In other words, the tire is slipping, and little force is required to position the tire at the measured turn angle. In effect, the measured steering force is a measure of the lateral acceleration created by a lateral force input to the vehicle by the wheel and tire, and in the event that an icy roadway prevents the wheel and tire from creating a high level of lateral force input, a system according to the present invention will note this and determine that the road adhesion is a low value. The driver may notice that the vehicle is negotiating the turn with a radius of curvature which exceeds the radius which he normally would anticipate. It should be noted that operation of system according to the present invention is independent of the type of tire, or for that matter, whether the tire—s tread is intact. This result stems from the fact that this system feeds back information about vehicle velocity and steering force, as well as turn angle, to determine road adhesion. Accordingly, as tire wear changes the amount of road adhesion, this system could be used to warn the driver that his tires are unsafe. The present invention provides a system which is superior to any system which functions by merely measuring brake torque, because such a system cannot account for the loss of brake force due to such causes as lining wear, brake drum or rotor glazing, variations in brake pressure, or other causes.

In the event that a very low level of road adhesion is detected, steering assist controller 48, could be given a signal by control module 16 to reduce the amount of boost provided by a power steering system. Accordingly, the driver could be offered increased feedback of road condition during episodes of adverse weather. In practice, the means for controlling the output of a power source or hydraulic pump associated with the steering system could comprise a valve for modulating the magnitude of the steering assistance provided by the power assist device.

Depending upon the sensed level of road adhesion, the control module could give other commands to suspension controller 50. For example, in the event that low road adhesion is detected, suspension controller 50 could be directed to adjust the level of damping produced by adjustable suspension units from a higher level to a relatively lower level. Also, brake controller, 42, could be directed to implement an antilock braking control mode depending upon the level of road adhesion measured by a system according to this invention. Finally, speed control 46 could be given yet another signal by control module 16 to limit the maximum speed of the vehicle consistent with the sensed road adhesion conditions.

A system according to the present invention could be employed in conjunction with a system useful for detecting road undulations. Such a system is described in U.S. Pat. No. 126,068, titled "Control System and Method for Operating Adjustable Vehicular Suspension Unit Over Undulating Road Surfaces" filed on Nov. 27, 1987, which is assigned to the assignee of the present invention, and which describes means for detecting vertical velocity of road wheel with respect to the vehicle's chassis. Whenever a system is employed which may be relied upon to inform control module 16 that the vehicle's road wheels may not be in contact with the road surface, such information could be used to modify information produced by a system according to the present invention.

Various modifications and variations will, no doubt, occur to those skilled in the arts to which this invention pertains. For example, the computer architecture described herein may be modified according to the individual needs of the system being designed. This system could be constructed using analog circuit devices rather than the illustrated digital devices. Similarly, the choice of which systems to control as part of the emergency control means responsive to a signal indicating that road adhesion is less than a threshold value is a choice within the province of the individual employing a system according to this invention. These and all other variations which basically rely on the teachings with which this disclosure has advanced the art are properly considered within the scope of this invention as defined by the following claims.

I claim:
1. A system for determining the road adhesion of a tire installed on a road wheel of an automotive vehicle operating on a roadway, comprising;
   road wheel turn angle measuring means comprising means for producing a first signal representing the turn angle at which the steering system of said vehicle is being operated;

vehicle speed measuring means comprising means for producing a second signal representing the speed at which said vehicle is being operated;

steering force measuring means comprising means for producing a third signal representing the steering force required to operate the steering system of said vehicle at said measured road wheel turn angle and said measured vehicle speed; and processor means for determining the road adhesion of said tire, with said processor means comprising means for receiving said first, second, and third signals and means for deriving from said signals a fourth signal representing the magnitude of said road adhesion.

2. A system according to claim 1 wherein said processor means determines road adhesion by matching measured road wheel turn angle, vehicle speed and steering force with one of a plurality of reference triads comprising road wheel turn angle, vehicle speed and steering force values, where each of such reference triads corresponds to a predetermined value of road adhesion, and by reading a corresponding value for said fourth signal depending upon the results of said matching.

3. A system according to claim 2 wherein said processor means comprises a read-only memory containing said reference triads and said fourth signal values.

4. A system according to claim 1 wherein said road wheel turn angle measuring means comprises an electro-optical angle measuring means operatively connected with a steering system for controlling said road wheel with said angle measuring means being responsive to movement of a steering handwheel.

5. A system according to claim 1 wherein said processor means determines road adhesion by operating upon said first, second and third signals with a mathematical function contained in said processor.

6. A system according to claim 1 wherein said vehicle speed measuring means comprises a signal generator driven by a powertrain of said vehicle.

7. A system according to claim 1 wherein said steering force measuring means comprises a pressure transducer interposed between a steering gear for steering said road wheel and a hydraulic pump for powering said steering gear.

8. A system according to claim 1 wherein said steering force measuring means comprises a torque sensor for sensing torque applied to a driveshaft of a steering gear for steering said road wheel.

9. An emergency operating system for determining the road adhesion of a tire installed on a road wheel of an automotive vehicle operating on a roadway, comprising:

road wheel turn angle measuring means comprising means for producing a first signal representing the turn angle at which the steering system of said vehicle is being operated;

vehicle speed measuring means comprising means for producing a second signal representing the speed at which said vehicle is being operated;

steering force measuring means comprising means for producing a third signal representing the steering force required to operate the steering system of said vehicle at said measured road wheel turn angle and said measured vehicle speed; and Processor means for determining the road adhesion of said tire, with said processor means comprising means for receiving said first, second, and third signals and means for deriving from said signals a fourth signal in the event that the magnitude of said road adhesion is less than a threshold value; and emergency control means responsive to said fourth signal for operating an emergency control system.

10. A system according to claim 9 wherein said emergency control system comprises means for regulating the operation of a brake system incorporated in said vehicle.

11. A system according to claim 9 wherein said emergency control system comprises means for warning the driver of said vehicle that road adhesion is less than said threshold value.

12. A system according to claim 9 wherein said emergency control system comprises means for limiting the maximum speed of the vehicle.

13. A system according to claim 9 wherein said emergency control system comprises means for limiting the maximum forward acceleration of the vehicle.

14. A system according to claim 9 wherein said emergency control system comprises means for operating an adjustable suspension system.

15. A system according to claim 14 wherein said emergency control system comprises means for controlling damping produced by said adjustable suspension system.

16. A system according to claim 9 wherein said emergency control system comprises means for controlling the output of a power assist device associated with said steering system.

17. A system according to claim 16 wherein said means for controlling the output of a power assist device associated with said steering system comprises a valve for limiting the magnitude of the assist produced by said power assist device.

* * * * *